(No Model.) 2 Sheets—Sheet 1.
J. DRADER.
ROTARY PLOW.
No. 411,650. Patented Sept. 24, 1889.
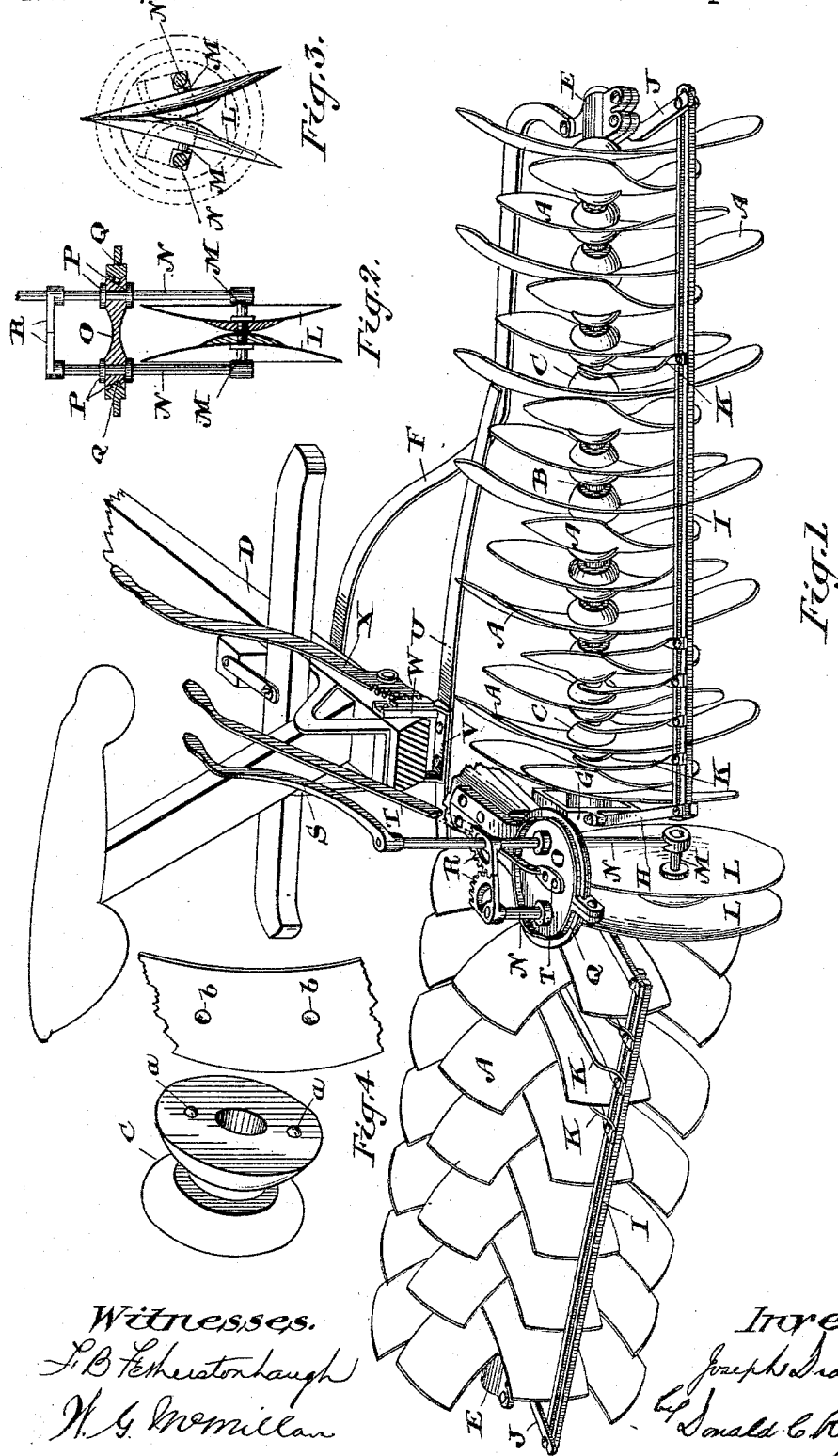

(No Model.) 2 Sheets—Sheet 2.

J. DRADER.
ROTARY PLOW.

No. 411,650. Patented Sept. 24, 1889.

Witnesses.
F. B. Featherstonhaugh.
W. G. McMillan

Inventor
Joseph Drader
by
Donald C. Ridout & Co
Atty

UNITED STATES PATENT OFFICE.

JOSEPH DRADER, OF LONDON, ONTARIO, CANADA.

ROTARY PLOW.

SPECIFICATION forming part of Letters Patent No. 411,650, dated September 24, 1889.

Application filed December 24, 1888. Serial No. 294,455. (No model.)

*To all whom it may concern:*

Be it known that I, JOSEPH DRADER, of the city of London, in the county of Middlesex, in the Province of Ontario, Canada, manufacturer of agricultural implements, have invented a certain new and Improved Rotary Plow, of which the following is a specification.

The object of the invention is to design an improved rotary plow which will effectually turn up the soil without forming furrows or ridges and without any clogging of the spades; and it consists, essentially, first, of a rotary plow formed by a series of blades arranged a short distance apart upon a spindle passing through their center, the said blades being set so that their ends shall be substantially upon the line of an Archimedean screw, and when in operation no two adjacent blades shall simultaneously come in contact with the ground; secondly, of a double-disk plow located behind the tongue of the machine, between the frame carrying the curved blades, one set of which is carried on one side of the tongue, while the other set is carried on the opposite side of the said tongue; thirdly, in devising simple mechanism for angling the double-disk plows; fourthly, in devising simple mechanism by which the driver may direct at will pressure on the outer or inner ends of the spindles carrying the curved blades; fifthly, in locating between each pair of blades a ferrule having teats projecting from both ends, designed to fit into holes or recesses formed in the surface of the blades, the teats on one end of the ferrule being set in such relation to the teats on its opposite end that the adjacent blades separated by the said ferrule shall be held at the proper angle to each other, so that their ends shall be substantially upon the line of an Archimedean screw, and, sixthly, of a peculiarly-constructed bearing for supporting the inner ends of the spindles carrying the blades, so that the inner ends of the said spindles may be adjusted without straining the bearing, substantially as hereinafter more particularly explained.

Figure 5:
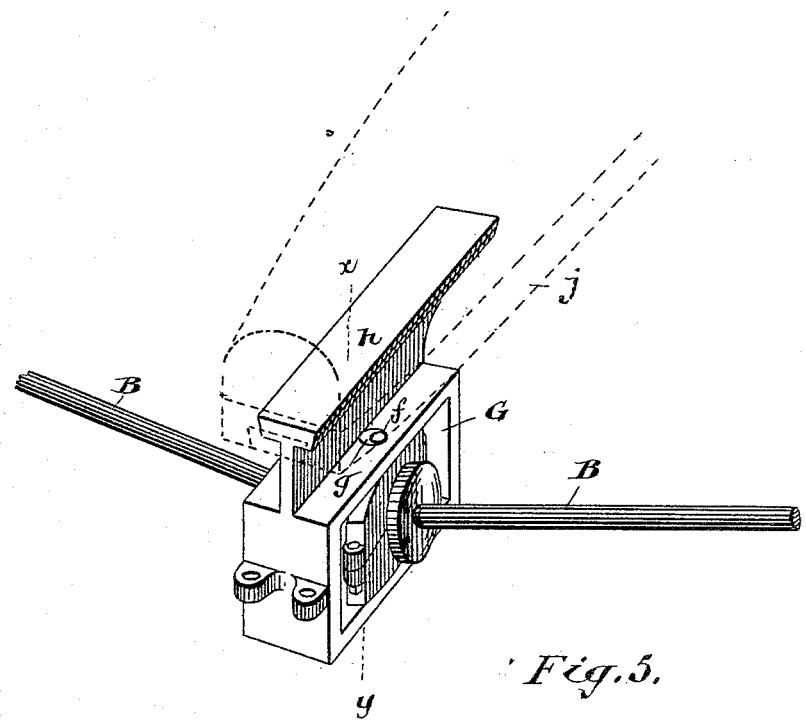
Figure 6:
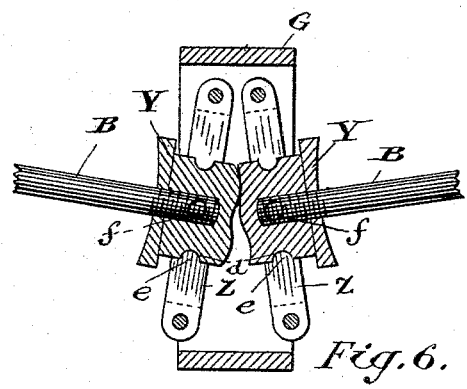
Figure 7:
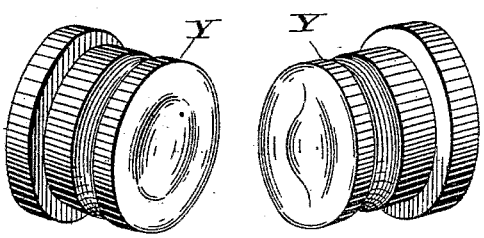

Figure 1 is a perspective end view of my improved rotary plow. Fig. 2 is a sectional detail of the pair of disk plows. Fig. 3 is a top plan of the disk plows. Fig. 4 is a perspective detail of one of the ferrules and of a portion of one of the blades. Fig. 5 is a perspective detail of the bracket G and bearings for supporting the inner ends of the spindles B. Fig. 6 is a sectional plan of Fig. 5 through $x$ $y$. Fig. 7 is an enlarged perspective detail of the bearing-box formed upon or connected to the inner ends of the spindle B.

A represents a series of curved blades arranged a short distance apart upon the spindle B, which passes through the center of the said blades. In practice I preferably arrange the blades A at about two inches apart at the point where the spindle B passes through them.

C is a ferrule located between each pair of blades A. This ferrule has teats $a$ projecting from both ends of the ferrule and designed to fit into holes or recesses $b$, formed in the surface of the blades A, the teats on one end of the ferrule being set in such relation to the teats on its opposite end that the adjacent blades separated by the said ferrule shall be held at the proper angle to each other, so that their ends shall be substantially upon the line of an Archimedean screw.

It will be noticed that there are two sets of blades A, set one on each side of the tongue D. The outer end of each spindle B is supported in a bearing-box E.

F is a brace extending from the bearing-box E to the tongue D. The inner ends of the spindle B are supported in peculiarly-formed bearings (which I shall describe farther on) carried in an adjustable bracket G.

H is an arm pivoted on the bracket G and extending back to form a support for the bar I, the opposite end of which is supported by an arm J, rigidly secured upon the bearing-box E.

K are scrapers, fork-shaped at one end to fit onto the ferrules C. The other end of each scraper K is adjustably connected upon the bar I. These scrapers are designed to remove from the revolving blades A any soil which adheres to them.

It will be noticed that the spindle B, on which the curved blades A are fixed, is set so that the curves of the blades shall point toward the outside of the machine.

In operation the spindles B are set so that their outer ends shall angle toward the front of the machine, bringing the line of the Archimedean screw substantially on a line with the draft of the machine. The curved blades, which are forced by weight into the soil, act when moving in the direction indicated like a series of spades, digging into and throwing up the soil every two inches; but, owing to the manner described in which the blades A are set in relation to each other, no two adjacent blades dig simultaneously into the soil, the blades which act together being about six inches apart when the adjacent blades are two inches apart and set as shown in the drawings. As a consequence of this arrangement there are no furrows or ridges formed, while the soil is effectually turned over at every two inches without the clogging which would happen were the blades which simultaneously act only two inches apart. As there is necessarily a space between the inner ends of the spindles B a strip, of uncut soil would be left at the center of the machine. With the view of effectually digging up this space I place a pair of concave-disk plows L between the inner ends of the spindles B, the concaves of the disks L facing toward the outside of the machine. The disks L are independently supported by their respective bearing-pin M, which is fixed to and extends at right angles from its respective post N. These posts extend through a disk O and are held in position by suitable collars P. An annular groove is formed around the disk O to receive an annular rib formed on the inside of the bracket Q, which is fixed to and supported by the tongue D or frame of the machine. The disk O is held in this manner by the bracket Q, so that it may be revolved in the said bracket.

R represents toothed quadrants fixed to the posts N and designed to mesh with each other.

S is a handle attached to one of the posts N. Owing to the connection described between the posts N, the movement of the handle S will angle the disks L so as to bring the front edges of the two disks together, as indicated in Fig. 3, thus causing the disks when entering the ground thus angled to raise and spread the soil outwardly. A handle T is fixed to the disk O for the purpose of enabling the said disk to be adjusted in its bracket Q when the machine is being turned, so that the disks L shall follow in the line of the draft of the plow.

When the machine is proceeding on a straight line, the handle T fits into a notch made in the bracket Q, thereby holding the disks L in line with the tongue during plowing.

U is a spring-plate, the outer ends of which rest upon the tops of the braces F. This plate U is bolted upon the bracket V. The sides of the bracket V fit into grooves formed in plates W, fixed on each side of the tongue D.

X is a lever pivoted on the tongue D, having a toothed quadrant formed on it to engage with a rack formed on the bracket V. It follows, therefore, that by the movement of the handle T the bracket V may be vertically adjusted on the tongue D. The object of this vertical adjustment is to enable the driver to force down the spring-plate U to increase the downward pressure on the outer or inner ends of the spindles B. By the introduction of the spring-plate U and provisions for its vertical adjustment, as described, the weight of the driver is distributed over the full length of the spindles B, thus causing all the blades A to act evenly upon the surface of the ground.

It will of course be understood that instead of forming the teats $a$ on the ferrule C the same effect would be produced by forming the teats $a$ on the blades A and the holes or recesses $b$ on the ferrule C.

On reference to Figs. 5, 6, and 7, the peculiarity of the bearings for supporting the inner ends of the spindles B will be understood. A cylindrical block Y is formed upon or fixed to the inner end of each spindle B, and an annular recess $d$ is formed in the said block to receive an annular rib $e$, which is formed around a hole made in the frame Z. It will of course be understood that the recess $d$ may be made in the frame Z, and the rib $e$ formed on the block Y. This frame Z is divided in two parts, so that it may be opened up to fit onto its block Y. At the center of the frame Z two pivot-pins $f$, opposite to each other, project, one pin projecting through an oblong hole $g$ made in the top of the bracket G, and the other pin projects through a corresponding oblong hole in the bottom of the said bracket. The blocks Y on the two spindles B have their ends shaped so that in butting together the least possible friction shall be created. Such a shape is shown in Figs. 6 and 7. By pivoting the frame Z, as described, so that it may be rocked either longitudinally or laterally, the necessary forward angle for the spindle B may be given, and the spindles carrying the blades may be vertically adjusted in passing over uneven ground without affecting in the least the bearing formed by the grooved block Y, fixed to the spindle B and revolving in the frame A, as shown, and by shaping and butting together the ends of the two blocks Y they resist and equalize the thrust of their respective spindles B, when the machine is in operation, without the creation of any unnecessary friction. The bracket G has a head $h$ formed on it, substantially as indicated in Fig. 5, to fit into a dovetailed recess formed in the plate $j$, attached to the bottom of the tongue D. Suitable mechanism is provided for adjusting the bracket G, according to the angle at which it may be desired to set the spindles B—that is to say, when the machine is to be used the inner ends of the spindle B are moved back until they are set at the proper angle for work, or when it is desired to drive the machine over the ground without plowing the bracket G, which carries the ends of the spindles B, is moved forward until the center lines of the spindles correspond with each other; but I do not show this mechanism, as the same means are used in rotary disk harrows.

What I claim as my invention is—

1. The combination, with a series of blades supported on a spindle, of ferrules fitted onto the spindle, one between each pair of blades, each ferrule having teats projecting from both of its ends designed to fit into holes or recesses formed in the surface of the blades, the teats on one end of each ferrule being set in such relation to the teats on its opposite end that the adjacent blades separated by the said ferrule shall be held at the proper angle to each other, so that their ends shall be substantially upon the line of an Archimedean screw, substantially as and for the purpose specified.

2. The combination, with a series of curved blades arranged as described, of a series of scrapers forked and supported at one end by the ferrule separating the blades and at their other ends adjustably connected to a horizontal bar suitably supported, as described, substantially as and for the purpose specified.

3. A frame and the spindles B and their blades, combined with the pair of concave-disk plows independently supported in proximity to each other between said spindles in such a manner that their outer edges may be angled, substantially as and for the purpose specified.

4. The disks L, independently journaled in proximity to each other and supported by the posts N, carried by the disk O, in combination with the toothed quadrants R and handle S, arranged substantially as and for the purpose specified.

5. The disk O, journaled in the bracket Q, and the posts N, connected to the disk O and arranged to support the disks L, substantially as and for the purpose specified.

6. The plate U, arranged to extend over and rest upon the brace F and fixed to the bracket V, in combination with the lever X, pivoted to the tongue D and having a toothed quadrant formed on it to engage with the rack formed on the bracket V, substantially as and for the purpose specified.

7. The spindle B, having a cylindrical block Y formed upon or connected to it, in combination with a pivoted frame Z, having a hole in it around which an annular rib $e$ is formed to fit into an annular recess $d$ made in the block Y, substantially as and for the purpose specified.

8. The blocks Y, formed upon or connected to the inner ends of the spindles B and having their ends shaped so that they will butt against and engage with each other with the least possible friction, in combination with the frames Z, forming journal-boxes for the blocks Y and provided with pins $f$ to fit into oblong holes $g$ made in the bracket G, substantially as and for the purpose specified.

London, December 5, 1888.

JOSEPH DRADER.

In presence of—
  W. H. WORTMAN,
    *London, Canada, Manufacturer.*
  T. H. LUSCOMBE,
    *London, Canada, Barrister-at-Law.*